UNITED STATES PATENT OFFICE.

FRANZ SCHOLL, OF HÖCHST-ON-THE-MAIN, GERMANY, ASSIGNOR TO THE FARBWERKE, VORMALS MEISTER, LUCIUS & BRÜNING, OF SAME PLACE.

ORANGE DYE AND PROCESS OF MAKING SAME.

SPECIFICATION forming part of Letters Patent No. 656,858, dated August 28, 1900.

Application filed June 23, 1900. Serial No. 21,300. (Specimens.)

*To all whom it may concern:*

Be it known that I, FRANZ SCHOLL, Ph.D., a citizen of the Empire of Germany, residing at Höchst-on-the-Main, Germany, have invented certain new and useful Improvements in the Manufacture of Substantive Dyestuffs for Cotton Fast to Alkali, Acid, and Light, of which the following is a specification.

I have found that a beautiful fast orange dyestuff for cotton may be obtained by combining diazotized primulin with 1-para-sulfophenyl-5-paryzolone-3-carbonic acid. To manufacture this dyestuff, I employ the diazotized sulfonic acid of the primulin base obtained from paratoluidin with sulfur, on the one hand, and 1-para-sulfophenyl-5-pyrazolone-3-carbonic acid, on the other hand.

Example: Seventy-five kilos of primulin sulfonic acid and seven kilos of sodium nitrite are dissolved in one thousand liters of water. This solution is run while stirring into thirty-six kilos of hydrochloric acid (thirty-per-cent. strength) and about one hundred liters of water. After a few hours the diazo compound thus obtained is run into a solution of thirty-five kilos of 1-para-sulfophenyl-5-pyrazolone-3-carbonic acid and thirty kilos of sodium carbonate in about four hundred liters of water. The combination is soon completed. The dyestuff is salted out. The dyestuff thus obtained by combining one molecular proportion of diazotized primulin sulfonic acid with one molecular proportion of 1-para-sulfophenyl-5-pyrazolone-3-carbonic acid is an orange-red powder easily soluble in cold water with an orange-yellow color, becoming redder on addition of caustic alkali, almost insoluble in alcohol, and insoluble in ether, benzene, and petroleum. It separates from its aqueous solution in the form of orange-yellow flakes upon the addition of mineral acids, is soluble in concentrated sulfuric acid with a reddish-yellow color, and dyes cotton in a neutral and alkaline bath orange.

Having thus described my invention, I claim—

1. As a new product, the new orange dyestuff obtained by combining one molecular proportion of diazotized primulin sulfonic acid with one molecular proportion of 1-para-sulfophenyl-5-pyrazolone-3-carbonic acid, being an orange-red powder, easily soluble in cold water with an orange-yellow color, almost insoluble in alcohol, insoluble in ether, benzene and petroleum, soluble in concentrated sulfuric acid with a reddish-yellow color, separating from its aqueous solution on the addition of mineral acids in the form of orange-yellow flakes, and directly dyeing cotton in a neutral and alkaline bath orange, substantially as set forth.

2. The herein-described process of manufacturing an azo dyestuff directly dyeing cotton orange, which consists in allowing diazotized primulin sulfonic acid to act upon 1-para-sulfophenyl-5-pyrazolone-3-carbonic acid, substantially as set forth.

In testimony that I claim the foregoing as my invention I have signed my name in presence of two subscribing witnesses.

FRANZ SCHOLL.

Witnesses:
HEINRICH HAHN,
ALFRED BRISBOIS.